US008078660B2

(12) United States Patent
Quinnell et al.

(10) Patent No.: US 8,078,660 B2
(45) Date of Patent: Dec. 13, 2011

(54) BRIDGE FUSED MULTIPLY-ADDER CIRCUIT

(75) Inventors: Eric Quinnell, Austin, TX (US); Earl E. Swartzlander, Jr., Austin, TX (US); Carl Lemonds, Austin, TX (US)

(73) Assignee: The Board of Regents, University of Texas System, Austin, TX (US)

( * ) Notice: Subject to any disclaimer, the term of this patent is extended or adjusted under 35 U.S.C. 154(b) by 917 days.

(21) Appl. No.: 12/100,202

(22) Filed: Apr. 9, 2008

(65) Prior Publication Data

US 2008/0256161 A1 Oct. 16, 2008

Related U.S. Application Data

(60) Provisional application No. 60/911,018, filed on Apr. 10, 2007.

(51) Int. Cl.
*G06F 7/483* (2006.01)
(52) U.S. Cl. ........................ 708/501; 708/523
(58) Field of Classification Search ................ None
See application file for complete search history.

(56) References Cited

U.S. PATENT DOCUMENTS

| | | | | |
|---|---|---|---|---|
| 6,282,557 | B1 | 8/2001 | Dhong et al. | |
| 7,461,117 | B2 * | 12/2008 | Trong et al. | 708/501 |
| 7,499,962 | B2 * | 3/2009 | Tang et al. | 708/501 |
| 7,917,568 | B2 * | 3/2011 | Henry et al. | 708/523 |
| 7,966,609 | B2 * | 6/2011 | Serebryany | 717/151 |
| 2002/0194240 | A1 * | 12/2002 | Pangal et al. | 708/501 |
| 2003/0041082 | A1 * | 2/2003 | Dibrino | 708/501 |
| 2003/0126174 | A1 * | 7/2003 | Kawata | 708/501 |
| 2004/0122886 | A1 * | 6/2004 | Gerwig et al. | 708/523 |
| 2005/0144214 | A1 * | 6/2005 | Datta et al. | 708/523 |
| 2006/0136540 | A1 | 6/2006 | Tang et al. | |
| 2007/0061392 | A1 * | 3/2007 | Gerwig et al. | 708/523 |
| 2008/0256162 | A1 * | 10/2008 | Henry et al. | 708/523 |
| 2011/0137970 | A1 * | 6/2011 | Dockser et al. | 708/501 |

* cited by examiner

*Primary Examiner* — David H Malzahn
(74) *Attorney, Agent, or Firm* — Anthony P. Ng; Yudell Isidore Ng Russell PLLC

(57) ABSTRACT

A bridge fused multiply-adder is disclosed. The fused multiply-adder is for the single instruction execution of (A×B)+C. The bridge fused multiply-add unit adds this functionality to existing floating-point co-processor units by including a fused multiply-add hardware "bridge" between an existing floating-point adder and a floating-point multiplier unit. This fused multiply-add functionality is added to existing two-operand architecture designs without degrading the performance or parallel pipe execution of floating-point adder and floating-point multiplier instructions.

5 Claims, 4 Drawing Sheets

BRIDGE FUSED MULTIPLY-ADDER CIRCUIT

PRIORITY CLAIM

The present application claims priority under 35 U.S.C. §119(e)(1) to provisional application No. 60/911,018 filed on Apr. 10, 2007, the contents of which are incorporated herein by reference.

BACKGROUND OF THE INVENTION

1. Technical Field

The present invention relates to digital circuits in general, and, in particular, to fused multiply-adder circuits. Still more particularly, the present invention relates to an apparatus for combining a floating-point adder and a floating-point multiplier to provide a bridge fused multiply-adder circuit having fused-multiply add functionalities.

2. Description of Related Art

A floating-point unit is designed to perform various mathematical operations on floating-point numbers. It is always useful to enhance the speed of a floating-point unit, and one known technique is to provide specialized hardware to implement certain floating-point functions. For example, a fused multiply-adder circuit can be implemented within a floating-point unit to perform multiply-accumulate functions that are commonly used in digital signal processing operations.

A fused multiply-adder circuit basically combines a multiplication operation with an add operation to perform a single instruction execution of the equation (A×B)+C. Within a fused multiply-adder circuit, a multiplicand and a multiplier are initially multiplied via a partial product generation module. The partial products are then added by a partial product reduction module that reduces the partial products to a Sum and a Carry in their redundant form. The redundant Sum and Carry are further added to an addend via a carry-save adder to form a second redundant Sum and a second redundant Carry. The second redundant Sum and the second redundant Carry are subsequently added within a carry-propagate adder to yield a Sum Total.

Since the early 1990s, a plethora of algorithms that utilize the (A×B)+C single-instruction equation have been introduced for applications in digital signal processing and graphics processing. To complement the ever increasing usage of the fused multiply-add instruction, the floating-point adder (FPA) and floating-point multiplier (FPM) of some chips are entirely replaced with a fused multiply-adder by using constants, such as (A×B)+0.0 for single multiplies and (A×1.0)+C for single adds. The combination of industrial implementation and increasing algorithmic activities has prompted the IEEE 754r committee to consider the inclusion of the fused multiply-add instruction into the IEEE standard for floating-point arithmetic.

SUMMARY OF THE INVENTION

In accordance with a preferred embodiment of the present invention, a bridge fused multiply-adder circuit includes an alignment module and a bridge fused multiply-add module. The bridge fused multiply-adder circuit also includes a carry-save adder (CSA) tree used by a floating-point multiplier, and an add/round module used by a floating-point adder. The bridge fused multiply-adder circuit allows the parallel processing of a floating-point addition and a floating-point multiplication instruction or a serial processing of a fused multiply-add instruction. The CSA tree multiplies a first operand and a second operand to generate a product that can be used by either a floating-point multiplication or a fused multiply-add operation. The alignment module shifts the addend with respect to the product selected for a fused multiply-add operation. The bridge fused multiply-add module then adds and normalizes the operands into an un-rounded result. Finally, the add/round module selects between a floating-point addition or a fused multiply-add operation and finishes the selected output to generate a rounded result.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Generally speaking, a fused multiply-adder circuit executes a multiply-accumulate operation within a single operation as $$S=(A\times B)+C$$

Thus, a fused multiply-adder circuit is designed to accept up to three operands as inputs. If certain instructions need fewer than three operands, then a constant is forced into the unused operand. For example, if only the addition of A and C is required, then a constant 1.0 is forced into operand B. The basic principle of operations of a fused multiply-adder can be divided into three separate tasks, as follows:

1. parallel calculation of the true mantissa and exponent;
2. bit alignment of the values to be added (pre-normalization); and
3. addition followed by post normalization.

I. Prior Art Fused Multiply-Adder

Figure 1:
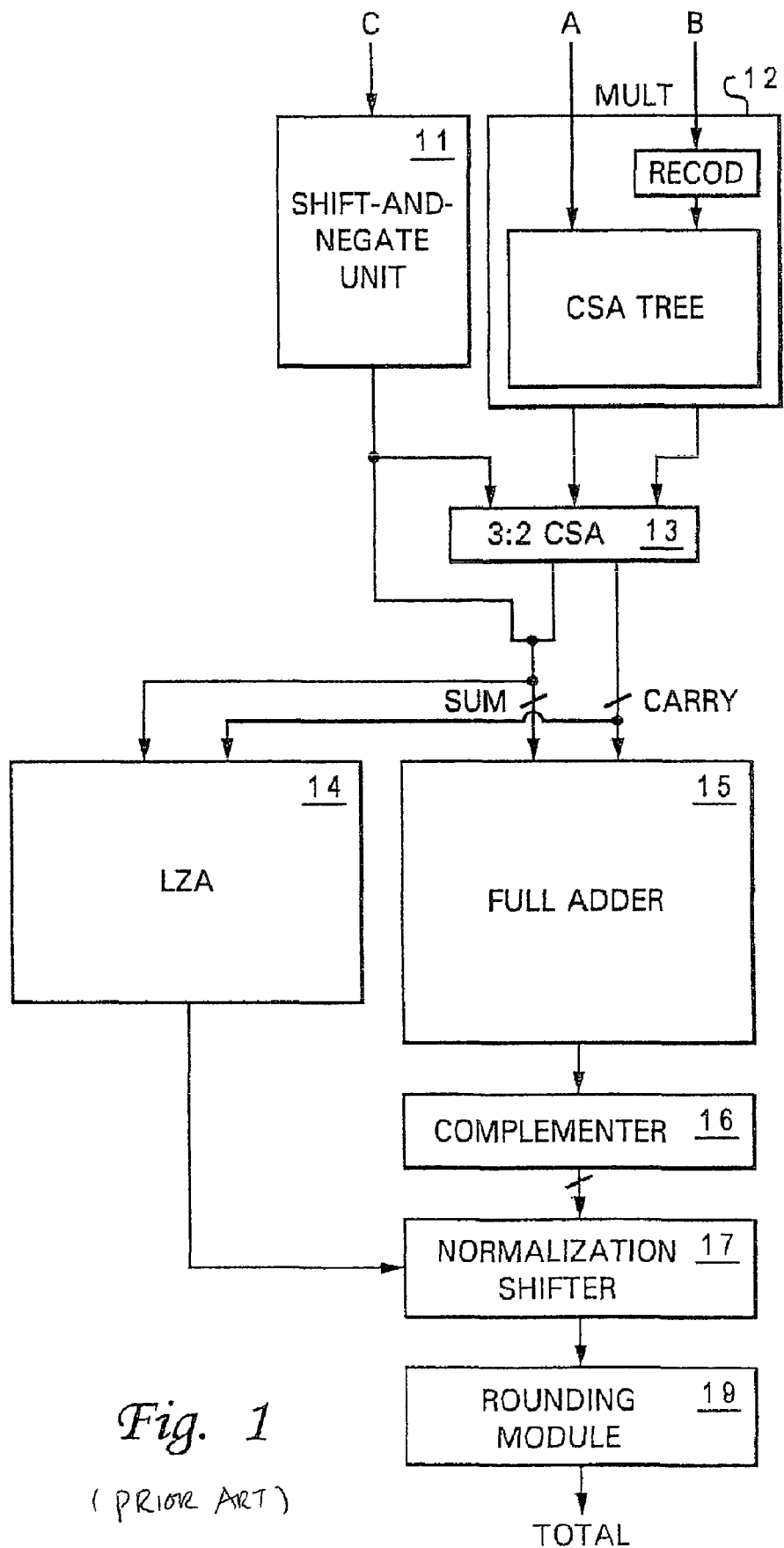
FIG. 1 is a block diagram of a fused multiply-adder, according to the prior art.

Referring now to the drawings and in particular to FIG. 1, there is depicted a block diagram of a fused multiply-adder, according to the prior art. As shown, a fused multiply-adder 10 includes a shift-and-negate module 11, a multiplication module 12, a 3-to-2 carry-save adder (CSA) 13, a leading zero anticipator (LZA) 14, a full adder 15, a complementer 16, a normalization shifter 17, and a rounding module 18. Fused multiply-adder 10 performs a multiply-accumulate operation by initially multiplying a multiplicand A and a multiplier B within multiplication module 12 to produce an intermediate product A×B in a carry-save representation. Within the same pipeline stage, addend C undergoes a bit inversion and bit alignment via shift-and-negate module 11. The bit alignment is performed by placing addend C to the left of the most significant bit of the intermediate product A×B. Two extra bits are placed between addend C and the intermediate product A×B to allow for correct rounding. 3-to-2 CSA 13 is a standard CSA having three inputs two outputs, the two outputs being the sum and carry outputs. The aligned addend C is added to the carry-save representation of the intermediate product A×B with a 3-to-2 CSA. The most significant bits of the aligned addend C are then concatenated at the output of 3-to-2 CSA 13 to obtain a sum in a carry/save format.

The outputs of 3-to-2 CSA 13 are applied to full adder 15 that adds the sum and carry results from 3-to-2 CSA 13. Although not shown, full adder 15 also includes a carry-in input for receiving a carry-in, and a carry-out output for providing a carry-out if the result of the add operation generates a carry-out. Complementer 16 receives the output of full adder 15 and complements the values received. LZA 14 recognizes the leading zeroes of the sum and carry outputs from 3-to-2 CSA 13. In conjunction with LZA 14, normalization shifter 17 eliminates leading zeroes of the output from complementer 16 by shifting the mantissa as well as incrementing or decrementing the exponent accordingly in order to maximize the accuracy of the output from complementer 16. Rounding module 18 provides the rounding that is required to conform the significance of the multiply-add operation to the required precision, often the original precision of the inputs.

II. Bridge Fused Multiply-Adder

Figure 2:
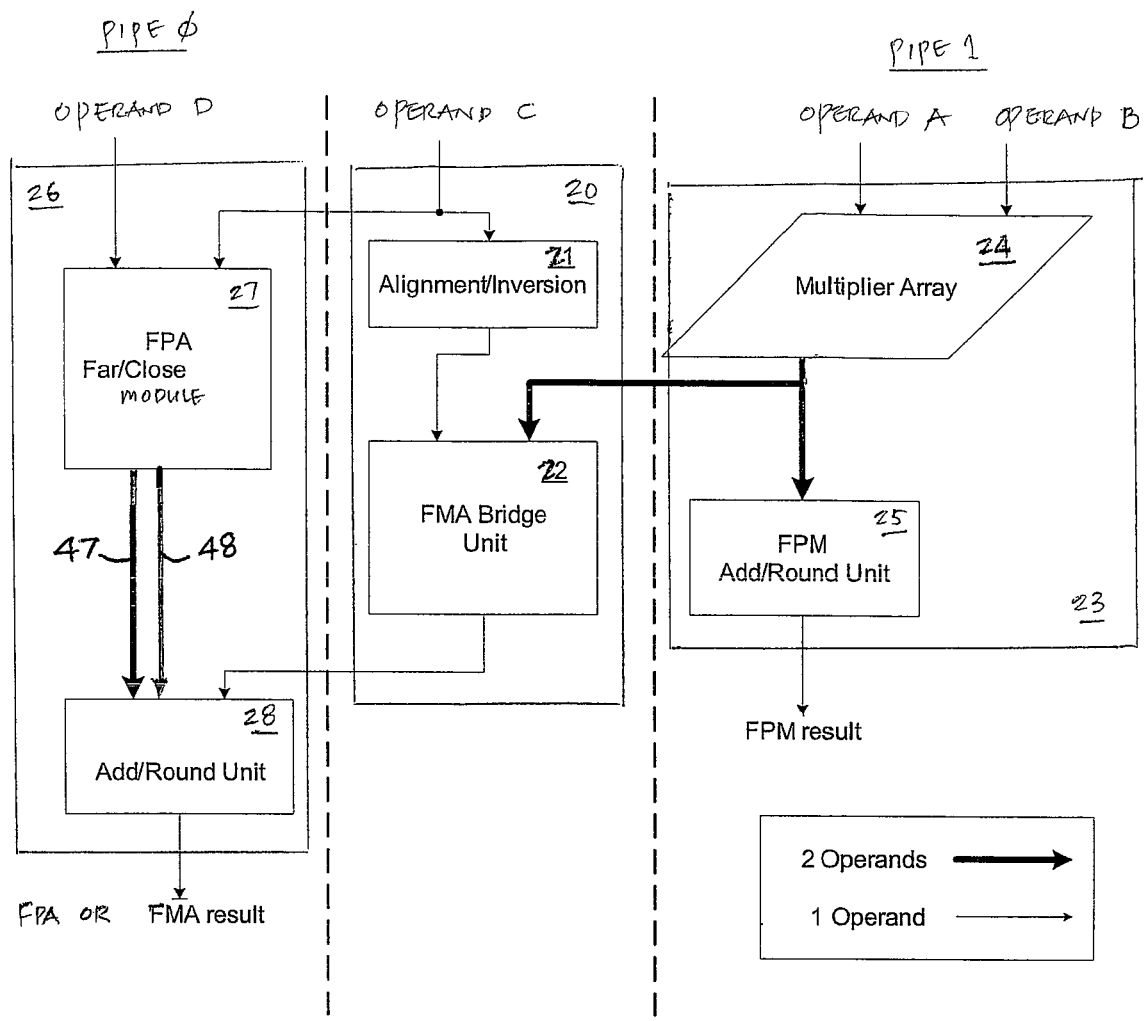
FIG. 2 is a block diagram of combining a floating-point adder and a floating-point multiplier to provide a circuit having fused-multiply add functionalities, in accordance with a preferred embodiment of the present invention.

Referring now to FIG. 2, there is depicted a block diagram of an apparatus for combining a floating-point adder and a floating-point multiplier to provide a circuit having fused-multiply add functionalities, in accordance with a preferred embodiment of the present invention. As shown, an apparatus 20, which includes an alignment/inversion module 21 and a fused multiply-adder bridge unit 22, combines a floating-point adder (FADD) unit 26 and a floating-point multiplier (FMUL) unit 23 to generate fused multiply-adder functionalities. FADD unit 26, as depicted in Pipe 0, and FMUL unit 23, as depicted in Pipe 1, both exist in parallel architectural execution pipes. FADD unit 26 includes a floating-point adder (FPA) far/close module 27. FMUL unit 23 includes a multiplier array 24 and a floating-point multiplier (FPM) add/round unit 25. FMUL unit 23 is connected to FADD unit 26 via apparatus 20.

Basically, apparatus 20 re-uses already existing hardware from both FMUL unit 23 and FADD unit 26 to keep the added functionality's increased cost of area and power low while not interrupting the parallel pipe execution of primitive instructions nor upsetting a floating-point unit's two-operand support structure. Apparatus 20 uses FMUL unit 26 to process both stand-alone multiplications as well as generating the partial product for a fused multiply-add instruction. FMUL unit 23 takes two operands (i.e., operand A and operand B) as inputs from Pipe 1. The significands of the operands are processed in a CSA tree within multiplier array 24, while the exponent and sign bits are processed in parallel. For a FMUL instruction, multiplier array 24 forwards sum and carry results to FPM add/round unit 25.

In response to a fused multiply-add instruction, apparatus 20 begins execution in the same way as an FMUL instruction. However, when the CSA tree within multiplier array 24 produces a product in a sum/carry format, the sum/carry product is passed to bridge unit 22 within apparatus 20 while FPM add/round unit 25 within FMUL unit 23 is shut down temporarily.

After accepting the sum/carry product from multiplier array 24, apparatus 20 combines the sum/carry product with a pre-aligned addend that created by a third operand (i.e., operand C). The third operand is also an input to Pipe 0. Alignment/inversion unit 21 within apparatus 20 then proceeds with an addition, complementation, and normalization, and the un-rounded result from alignment/inversion unit 21 is subsequently passes to add/round unit 28 within FADD unit 26.

Add/round unit 28 is designed to perform several functions. During the execution of a stand-alone FADD instruction, add/round unit 28 acts as a common FADD dual-path merge stage to select operands among a far-operands input path 47 and a close-operands input path 48 to add/round unit 28, depending on the nature of the exponential data. All the operands from far-operands input path 47 and close-operands input path 48 are constrained under their own architectural pipe (i.e., Pipe 0).

During the execution of a fused-multiply add instruction, the same multiplexors within add/round unit 28 that were used for performing merging in the FADD path select the un-rounded result from bridge unit 22. Specifically, add/round unit 28 receives as inputs the un-rounded result from bridge unit 22 and a set of null strings, because no additional operator is needed for the fused multiply-add rounding operation.

Figure 3:
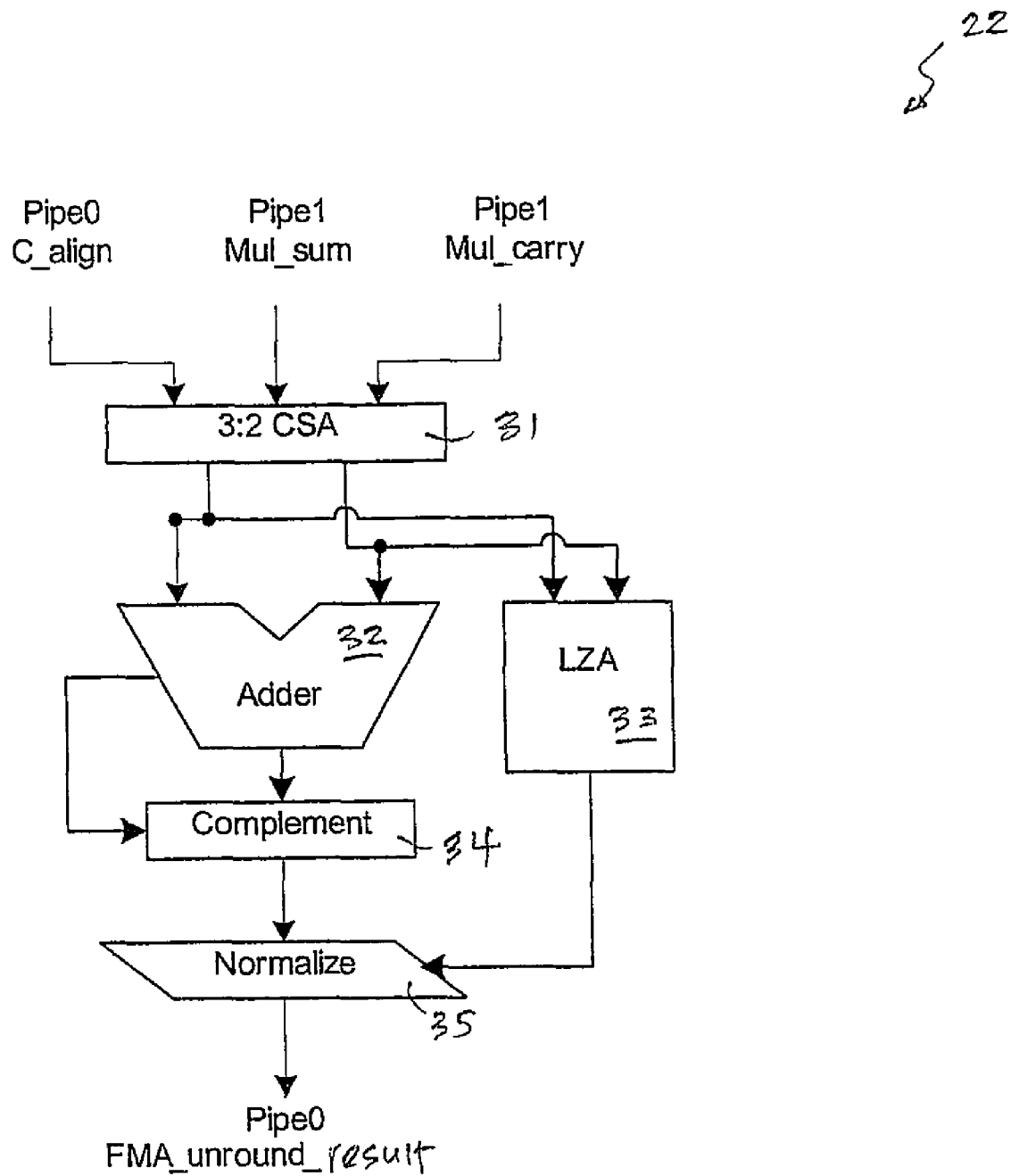
FIG. 3 is a block diagram of a bridge unit, in accordance with a preferred embodiment of the present invention.

Referring now to FIG. 3, there is depicted a block diagram of bridge unit 22 from FIG. 2, in accordance with a preferred embodiment of the present invention. As shown, bridge unit 22 includes a 3:2 CSA 31, an adder 32, an LZA 33, and complement module 34 and a normalization module 35. Bridge unit 22 accepts the computed multiplier sum (i.e., Mul_Sum) and carry product (i.e., Mul_carry) from a multiplier array (such as multiplier array 24 from FIG. 2) and combines the data with a pre-aligned 161-bit addition operand. Bridge unit 22 generates a fused multiply-add un-rounded result, and the fused multiply-add un-rounded result is passed to a FPA/FPM add/round unit (such as add/round unit 28 from FIG. 2) for final rounding and instruction completion.

Figure 4:
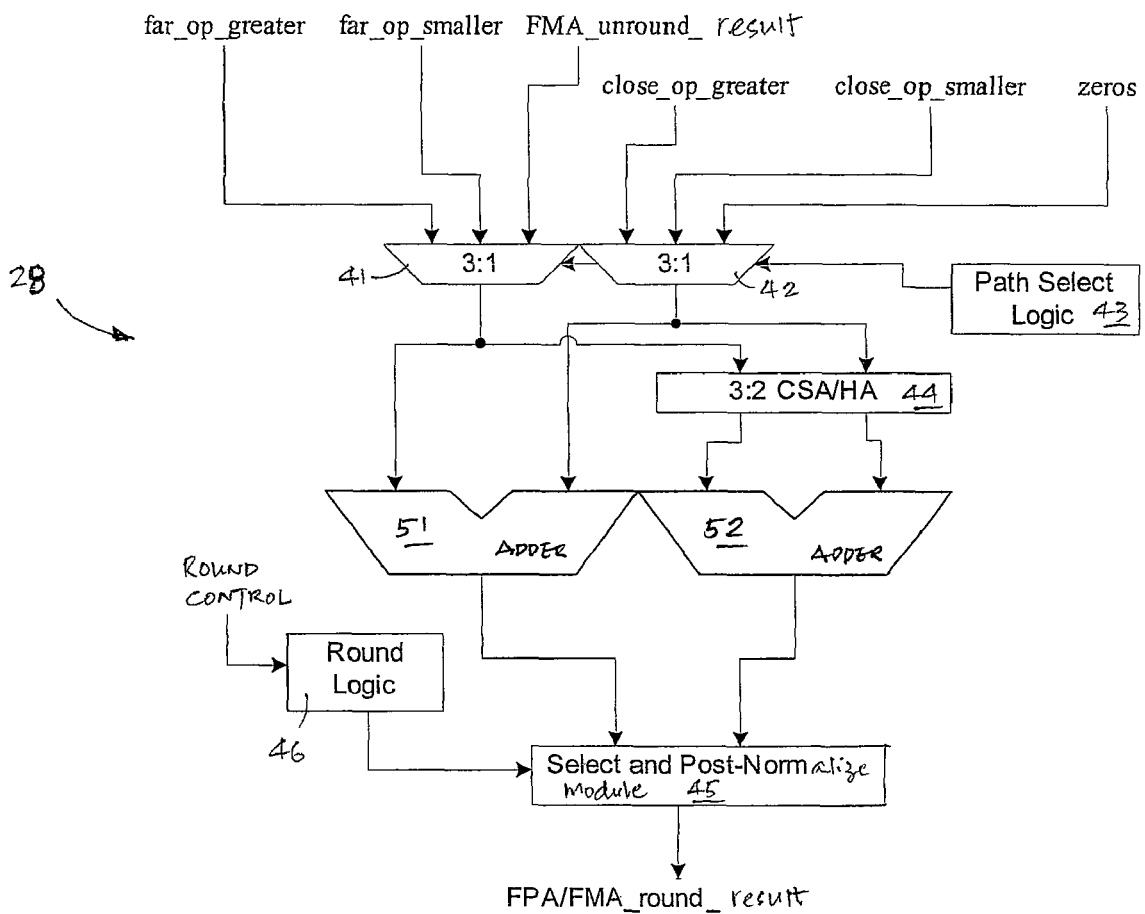
FIG. 4 is a block diagram of an add/round unit, in accordance with a preferred embodiment of the present invention.

With reference now to FIG. 4, there is depicted a block diagram of add/round unit 28 from FIG. 2, in accordance with a preferred embodiment of the present invention. As shown, add/round unit 28 includes two 3:2 multiplexors 41-42 controlled by a path select logic unit 43, a 3:2 CSA/half-adder 44, adders 51-52, and a select and post-normalize module 45 controlled by a round logic unit 46. Multiplexor 41 receives a far_op_greater input and a far_op_smaller input from far/close module 27 (from FIG. 2) and a FMA_unround_result input from bridge unit 22 (from FIG. 2). Multiplexor 42 receives a close_op_greater input and a close_op_smaller input from far/close module 27 and a zero input. Path select logic unit 43 controls multiplexors 41-42 by selecting different inputs to the outputs of multiplexors 41-42 based on the instruction being called.

During the execution of a stand-alone addition instruction, multiplexors 41-42 select operands among a far_op_greater operand, a far_op_smaller operand, a close_op_greater operand and a close_op_smaller operand (from far-operands input path 47 and close-operands input path 48 in FIG. 2) for CSA/half-adder 44 and adders 51-52. During the execution of a fused multiply-add instruction, multiplexors 41-42 select a fused multiply-add (FMA) un-rounded result from bridge unit 22 (from FIG. 2) and a string of zeros inputs. In both of the above-mentioned cases, select and post-normalize module 45 takes the results from adders 51-52 and produces a fully rounded and complete arithmetic result. The result can be a floating-point addition rounded result or a fused-multiply addition rounded result, depending on the instruction being called.

As has been described, the present invention provides an apparatus for combining a floating-point adder and a floating-point multiplier to yield a bridge fused multiply-adder circuit having fused-multiply add functionalities.

While the invention has been particularly shown and described with reference to a preferred embodiment, it will be understood by those skilled in the art that various changes in form and detail may be made therein without departing from the spirit and scope of the invention.

What is claimed is:

1. A bridge fused multiply-adder circuit, comprising:
    a floating-point adder;
    a floating-point multiplier;
    an alignment/inversion module, coupled to said floating-point adder, for sharing an input with said floating-point adder; and
    a bridge module, coupled to said floating-point adder and said floating-point multiplier, for combining a partial product from said floating-point multiplier with an output from said alignment/inversion module to generate an un-rounded output to be fed to said floating-point adder to produce a fused multiply-add result.

2. The bridge fused multiply-adder circuit of claim 1, wherein said floating-point multiplier includes a multiplier array for generating said partial product.

3. The bridge fused multiply-adder circuit of claim 2, wherein said floating-point multiplier further includes an add/round unit for generating a floating-point multiplication result.

4. The bridge fused multiply-adder circuit of claim 1, wherein said floating-point adder includes a floating-point adder far/close module.

5. The bridge fused multiply-adder circuit of claim 4, wherein said floating-point adder further includes a floating-point adder/round unit for generating a floating-point addition result or a fused multiply-add result.

* * * * *